(12) United States Patent
Hill et al.

(10) Patent No.: US 9,680,139 B2
(45) Date of Patent: *Jun. 13, 2017

(54) LOW-FLOOR ELECTRIC VEHICLE

(71) Applicant: Proterra Inc., Greenville, SC (US)

(72) Inventors: Dale Hill, New Braunfels, TX (US);
Michael Walker, Daly City, CA (US);
Shaun Onorato, Superior, CO (US);
Donald Morris, Littleton, CO (US);
Stephen Misencik, Raleigh, NC (US);
John Winkel, Thornton, CO (US)

(73) Assignee: Proterra Inc., Greenville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/992,900

(22) Filed: Jan. 11, 2016

(65) Prior Publication Data

US 2016/0126515 A1    May 5, 2016

Related U.S. Application Data

(63) Continuation of application No. 13/887,135, filed on May 3, 2013, now Pat. No. 9,252,417, which is a
(Continued)

(51) Int. Cl.
*H01M 2/10* (2006.01)
*B60K 1/04* (2006.01)
(Continued)

(52) U.S. Cl.
CPC .............. *H01M 2/1083* (2013.01); *B60K 1/04* (2013.01); *B60L 3/0046* (2013.01);
(Continued)

(58) Field of Classification Search
CPC ............. H01M 2/1083; H01M 10/613; H01M 2220/20; H01M 2/1077; H01M 10/625; B60K 1/04
See application file for complete search history.

(56) References Cited

U.S. PATENT DOCUMENTS

| 3,955,657 A | 5/1976 | Bossi |
| 4,109,064 A | 8/1978 | Warner et al. |

(Continued)

FOREIGN PATENT DOCUMENTS

| CN | 1482971 | 3/2004 |
| DE | 202005015123 | 12/2005 |

(Continued)

OTHER PUBLICATIONS

TCRP Synthesis 2, Low-Floor Transit Buses, Rolland D. King, Transportation Research Board, National Research Council, National Academy Press, Washington, D.C 1997, pp. 1-43.
(Continued)

*Primary Examiner* — Hau Phan
(74) *Attorney, Agent, or Firm* — Bookoff McAndrews, PLLC

(57) ABSTRACT

The invention provides for a high occupancy or heavy-duty vehicle with a battery propulsion power source, which may include lithium titanate batteries. The vehicle may be all-battery or may be a hybrid, and may have a composite body. The vehicle battery system may be housed within the floor of the vehicle and may have different groupings and arrangements.

20 Claims, 8 Drawing Sheets

Related U.S. Application Data continuation of application No. 12/459,074, filed on Jun. 26, 2009, now Pat. No. 8,453,773.

(60) Provisional application No. 61/076,480, filed on Jun. 27, 2008.

(51) Int. Cl.

| | | |
|---|---|---|
| *B60L 3/00* | (2006.01) | |
| *B60L 11/12* | (2006.01) | |
| *B60L 11/18* | (2006.01) | |
| *H01M 4/485* | (2010.01) | |
| *H01M 10/052* | (2010.01) | |
| *H01M 10/42* | (2006.01) | |
| *B60R 16/04* | (2006.01) | |
| *B60W 10/24* | (2006.01) | |
| *H01M 2/20* | (2006.01) | |
| *H01M 10/613* | (2014.01) | |
| *B62D 29/00* | (2006.01) | |
| *B62D 29/02* | (2006.01) | |
| *B62D 47/02* | (2006.01) | |
| *B60K 6/20* | (2007.10) | |

(52) U.S. Cl.
CPC ........... *B60L 11/126* (2013.01); *B60L 11/185* (2013.01); *B60L 11/1853* (2013.01); *B60L 11/1864* (2013.01); *B60L 11/1874* (2013.01); *B60L 11/1877* (2013.01); *B60L 11/1879* (2013.01); *B60R 16/04* (2013.01); *B60W 10/24* (2013.01); *B62D 29/00* (2013.01); *B62D 29/02* (2013.01); *B62D 47/02* (2013.01); *H01M 2/1077* (2013.01); *H01M 2/206* (2013.01); *H01M 4/485* (2013.01); *H01M 10/052* (2013.01); *H01M 10/42* (2013.01); *H01M 10/4207* (2013.01); *H01M 10/613* (2015.04); *B60K 6/20* (2013.01); *B60K 2001/0438* (2013.01); *B60L 2200/18* (2013.01); *B60L 2200/26* (2013.01); *B60L 2200/28* (2013.01); *B60L 2270/40* (2013.01); *B60Y 2200/14* (2013.01); *B60Y 2200/1432* (2013.01); *B60Y 2200/15* (2013.01); *H01M 2010/4271* (2013.01); *H01M 2220/20* (2013.01); *Y02E 60/122* (2013.01); *Y02T 10/6217* (2013.01); *Y02T 10/6269* (2013.01); *Y02T 10/7005* (2013.01); *Y02T 10/7011* (2013.01); *Y02T 10/7061* (2013.01); *Y02T 10/7072* (2013.01); *Y02T 10/7077* (2013.01); *Y02T 90/121* (2013.01); *Y02T 90/128* (2013.01); *Y02T 90/14* (2013.01)

(56) References Cited

U.S. PATENT DOCUMENTS

| | | |
|---|---|---|
| 4,216,839 A | 8/1980 | Gould et al. |
| 5,301,765 A | 4/1994 | Swanson |
| 5,362,345 A | 11/1994 | Stettler et al. |
| 5,385,793 A | 1/1995 | Tiedemann et al. |
| 5,501,289 A * | 3/1996 | Nishikawa ............... B60K 1/04 180/65.1 |
| 5,619,417 A | 4/1997 | Kendall |
| 5,666,040 A | 9/1997 | Bourbeau |
| 5,670,861 A | 9/1997 | Nor |
| 5,705,929 A | 1/1998 | Caravello et al. |
| 5,833,023 A | 11/1998 | Shimizu |
| 5,850,136 A | 12/1998 | Kaneko |
| 5,886,503 A | 3/1999 | McAndrews et al. |
| 5,993,993 A | 11/1999 | Hall |
| 6,040,080 A | 3/2000 | Minami et al. |
| 6,065,261 A | 5/2000 | Fehr et al. |
| 6,085,854 A | 7/2000 | Nishikawa |
| 6,104,967 A | 8/2000 | Hagen et al. |
| 6,227,125 B1 | 5/2001 | Schroeder et al. |
| 6,232,015 B1 | 5/2001 | Wyser |
| 6,284,404 B1 | 9/2001 | Horie et al. |
| 6,375,249 B1 | 4/2002 | Stanton et al. |
| 6,375,923 B1 | 4/2002 | Duyvesteyn et al. |
| 6,440,383 B1 | 8/2002 | Duyvesteyn et al. |
| 6,489,753 B1 | 12/2002 | Patterson |
| 6,518,734 B1 | 2/2003 | Nourai et al. |
| 6,548,039 B1 | 4/2003 | Duyvesteyn et al. |
| 6,554,348 B1 | 4/2003 | Gernstein |
| 6,631,775 B1 | 10/2003 | Chaney |
| 6,689,716 B2 | 2/2004 | Sabacky et al. |
| 6,773,842 B2 | 8/2004 | Liu et al. |
| 6,837,325 B2 | 1/2005 | Shimizu |
| 6,879,889 B2 | 4/2005 | Ross |
| 6,881,393 B2 | 4/2005 | Spitler et al. |
| 6,890,510 B2 * | 5/2005 | Spitler .................. B82Y 30/00 423/598 |
| 6,974,566 B2 | 12/2005 | Sabacky et al. |
| 6,982,073 B2 | 1/2006 | Sabacky et al. |
| 7,025,166 B2 | 4/2006 | Thomas |
| 7,082,772 B2 | 8/2006 | Welch |
| 7,353,900 B2 | 4/2008 | Abe et al. |
| 7,400,113 B2 | 7/2008 | Osborne |
| 7,419,209 B1 | 9/2008 | Mangiapane et al. |
| 7,520,355 B2 | 4/2009 | Chaney |
| 7,541,016 B2 | 6/2009 | Gorshkov et al. |
| 7,712,563 B2 | 5/2010 | Niebuhr |
| 7,997,368 B2 | 8/2011 | Takasaki et al. |
| 8,012,620 B2 | 9/2011 | Takasaki et al. |
| 8,022,666 B2 | 9/2011 | Li |
| 8,413,752 B2 | 4/2013 | Page et al. |
| 8,453,773 B2 | 6/2013 | Hill |
| 9,252,417 B2 * | 2/2016 | Hill ......................... B60K 1/04 |
| 2001/0046624 A1 | 11/2001 | Goto et al. |
| 2002/0081489 A1 | 6/2002 | Ng |
| 2003/0017104 A1 | 1/2003 | Spitler et al. |
| 2003/0118891 A1 | 6/2003 | Saito et al. |
| 2004/0134699 A1 | 7/2004 | Shimizu |
| 2005/0110460 A1 | 5/2005 | Arai et al. |
| 2005/0132562 A1 * | 6/2005 | Saito .................. H01M 4/0404 29/623.5 |
| 2005/0178632 A1 | 8/2005 | Ross |
| 2005/0214466 A1 | 9/2005 | Prochazka et al. |
| 2006/0040173 A1 | 2/2006 | Shimamura et al. |
| 2006/0068272 A1 | 3/2006 | Takami et al. |
| 2006/0149427 A1 | 7/2006 | Evans |
| 2007/0062744 A1 | 3/2007 | Weidenheimer et al. |
| 2007/0087266 A1 | 4/2007 | Bourke et al. |
| 2007/0149405 A1 | 6/2007 | Spitler |
| 2007/0190369 A1 | 8/2007 | Leach et al. |
| 2007/0196728 A1 | 8/2007 | Yang |
| 2007/0284159 A1 | 12/2007 | Takami et al. |
| 2008/0067972 A1 | 3/2008 | Takami et al. |
| 2008/0113264 A1 | 5/2008 | Inagaki et al. |
| 2008/0118819 A1 | 5/2008 | Gamboa et al. |
| 2008/0258676 A1 | 10/2008 | Lin |
| 2008/0297109 A1 | 12/2008 | Sandberg et al. |
| 2009/0175940 A1 | 7/2009 | Gruber |
| 2009/0242299 A1 | 10/2009 | Takasaki et al. |
| 2009/0320715 A1 | 12/2009 | Morita et al. |

FOREIGN PATENT DOCUMENTS

| | | |
|---|---|---|
| FR | 2687352 | 8/1993 |
| FR | 2687353 | 8/1993 |
| JP | 2000-102103 | 4/2000 |
| JP | 2001-016706 | 1/2001 |
| JP | 2003-017107 | 1/2003 |
| JP | 2004-234987 | 8/2004 |
| JP | 2004-248455 | 9/2004 |
| JP | 2005-289252 | 10/2005 |
| JP | 2005289252 | 10/2005 |
| JP | 2007-273181 | 10/2007 |
| JP | 2007-282375 | 10/2007 |
| JP | 2008-513949 | 10/2007 |

(56) References Cited

FOREIGN PATENT DOCUMENTS

| | | |
|---|---|---|
| JP | 2008-513949 | 5/2008 |
| JP | 2008-130424 | 6/2008 |
| WO | WO 2008/035511 | 3/2008 |

OTHER PUBLICATIONS

European search report and opinion dated Jul. 31, 2012 for EP application No. 09771205.3.
International search report dated Jan. 27, 2010 for PCT Application No. US2009/48952.

* cited by examiner

LOW-FLOOR ELECTRIC VEHICLE

CROSS-REFERENCE

This application is a continuation application of U.S. Ser. No. 13/887,135, filed May 3, 2013, which is a continuation application of U.S. patent application Ser. No. 12/459,074, filed Jun. 26, 2009, which claims the benefit of U.S. Provisional Application No. 61/076,480, filed Jun. 27, 2008, which applications are entirely incorporated herein by reference.

STATEMENT AS TO FEDERALLY SPONSORED RESEARCH

This invention was made with the support of the United States government under the National Fuel Cell Bus program, Project ID numbers GA-04-7001, GA-04-7002 by the Federal Transit Administration (FTA).

BACKGROUND

In recent years, hybrid and electric vehicles, which are provided with a battery, have been proposed, and some of them have been put into practice, to effectively use energy, in particular, regenerative energy as environmental measures. Typically, secondary batteries, which have been put to into practice and installed in vehicles so far, include, for example, lead storage batteries, nickel metal hydride batteries, or high powered lithium ion batteries.

The use of such batteries provide many challenges such as thermal degradation, or the requirement of significant volumes or space due to low capacity. Such batteries may be heavy, which can lead to decreased performance of vehicles. Furthermore, the active materials of the electrodes are low in the rate of occluding and discharging ions, and hence efficient charging cannot be achieved during fast charging, either form a stationary charger of regenerative charging. The speed of regenerative charging can be very pertinent for a heavy-duty vehicle, such as a bus, that may be regularly recharged within small time frames.

Thus, a need exists for a heavy-duty vehicle with a battery system capable of rapid charging. A further need exists for a heavy-duty vehicle that can efficiently utilize its battery system.

SUMMARY OF THE INVENTION

The invention is directed to a heavy-duty vehicle, such as a bus, with a power source capable of being fast-charged. In one aspect of the invention, the power source may include a lithium titanate battery source. In some instances, an additional power source may be provided. A power source may comprise one or more battery packs. The power source may be housed in the floor of the heavy-duty vehicle. In some instances, a plurality of battery packs may be individually mounted into cavities within the floor of a vehicle.

In accordance with another aspect of the invention, the vehicle may have a composite body. The body may be substantially formed from at least one composite material, such as high strength fiber glass or carbon fiber. In some instances, the high stress areas of the vehicle body may be formed from a composite material. Alternatively, the vehicle body may be formed of a lightweight metal or metal alloy.

One or more battery strings may be provided as a propulsion power source in accordance with an embodiment of the invention. Each string may include one or more battery pack. A battery pack may include one or more module, each of which may include one or more battery cell, such as a lithium titanate battery cell. A battery management system may be integrated at any level of a propulsion power source to provide sensor feedback or any alarms or alerts. The housing for the propulsion power source may include safety features, which may thermally or electrically isolate components.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The patent or application file contains at least one drawing executed in color. Copies of this patent or patent application publication with color drawings will be provided by the Office upon request and payment of the necessary fee.

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings:

DETAILED DESCRIPTION OF THE INVENTION

The invention provides systems and methods for vehicle batteries. Vehicle battery systems for heavy-duty vehicles or high occupancy vehicles including buses, vans, and class 5-8 trucks, may comprise lithium titanate batteries and may have various arrangements and configurations. Various aspects of the invention described herein may be applied to any of the particular applications set forth below or for any other types of vehicles or power sources. The invention may be applied as a standalone system or method, or as part of an integrated vehicle system. It shall be understood that different aspects of the invention can be appreciated individually, collectively, or in combination with each other.

Also, various aspects of the invention as described may be combined to provide a heavy-duty hybrid electric vehicle where the battery propulsion power source may deliver 12.5% or greater of the overall vehicle power. In various embodiments, the battery propulsion power source may deliver 15% or greater, 20% or greater, 25% or greater, 30% or greater, 40% or greater, 50% or greater, 70% or greater, 80% or greater, 90% or greater, 95% or greater, or substantially 100% of the overall vehicle power. In one example, features such as a lightweight composite body, efficient drivetrain, and lightweight batteries may be combined such that the battery propulsion power source may deliver a large percentage of the vehicle power requirement.

Figure 1:
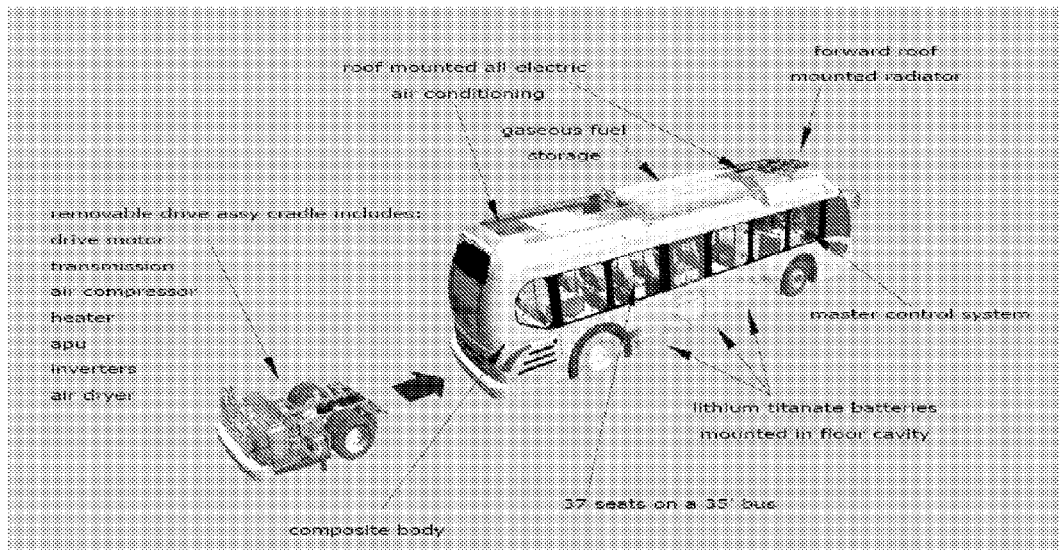
FIG. 1 shows a schematic of a bus with various features in accordance with one embodiment of the invention.

FIG. 1 shows a schematic of a bus with various features, in accordance with one embodiment of the invention. The features of the bus may be applied to other heavy-duty or high occupancy vehicles, wherein "heavy-duty vehicles" may include a transit bus, a school bus, a delivery van, a shuttle bus, a tractor trailer, a class 5 truck (weighing 16,001-19,500 lbs., two-axle, six-tire single unit), a class 6 truck (weighing 19,501-26,000 lbs., three-axle single unit), a class 7 truck (weighing 26,001-33,000 lbs., four or more axle single unit), a class 8 truck (weighing 33,000 lbs. and over, four or less axle single trailer), a vehicle with a GVWR weighing over 14,000 pounds, a vehicle with a cargo to driver mass ratio of 15:1 or greater, a vehicle with six or more tires, a vehicle with three or more axles, or any other type of high occupancy or heavy-duty vehicle.

A heavy-duty vehicle may have a propulsion power source, which includes batteries. In some embodiments of the invention, the heavy-duty vehicle may have one or more additional power sources, such as a combustion engine or a fuel cell. The heavy-duty vehicle may be an electric battery-powered vehicle or a hybrid electric vehicle, and may be able to use the same basic battery configuration, drive motor, and controller, regardless of whether the vehicle is an all-battery vehicle or a hybrid vehicle.

In some embodiments, a heavy-duty vehicle may travel a predetermined route, and stop at predetermined points for recharging. See, e.g., U.S. Pat. No. 3,955,657, which is hereby incorporated by reference in its entirety.

Propulsion Power Source

In one embodiment of the invention, the propulsion power source of a heavy-duty vehicle may include lithium titanate batteries. In some implementations, the propulsion power source may include batteries that are only lithium titanate batteries, without requiring any other types of batteries. The lithium titanate batteries may include any format or composition known in the art. See, e.g., U.S. Patent Publication No. 2007/0284159, U.S. Patent Publication No. 2005/0132562, U.S. Patent Publication No. 2005/0214466, U.S. Pat. No. 6,890,510, U.S. Pat. No. 6,974,566, and U.S. Pat. No. 6,881,393, which are hereby incorporated by reference in their entirety.

The use of lithium titanate batteries may enable rapid charging of a vehicle, and a long battery life. In some embodiments of the invention a battery propulsion power source may be able to charge to a very high state of charge within minutes. For instance, in a preferable embodiment, the power source may be able to charge to over 95% state of charge within ten minutes. In other embodiments of the invention, a battery propulsion power source may be able to charge to over 65% state of charge, over 70% state of charge, over 75% state of charge, over 80% state of charge, over 85% state of charge, over 90% state of charge, or over 95% state of charge within ten minutes, or nine minutes, seven minutes, five minutes, three minutes, or one minute.

In some implementations, a battery propulsion power source may be charged using a periodic off board charging connection. An off board charging system may be a battery charging system externally located from a vehicle. In an alternate implementation, a battery propulsion power source may be charged by using an on board power generation device. An onboard power generation device may be any power generation device that may be brought onto a vehicle or incorporated into a vehicle, which may incorporate various means to charge a battery.

In accordance with another embodiment of the invention, the propulsion power source may include batteries with any battery chemistry known in the art or later developed. Such electric or hybrid electric vehicle batteries may include, but are not limited to, lead-acid ("flooded" and VRLA) batteries, NiCad batteries, nickel metal hydride batteries, lithium ion batteries, Li-ion polymer batteries, zinc-air batteries or molten salt batteries. In some implementations, battery storage capacity may be within the 18 to 100 kWh capacity range.

In some alternate embodiments, the propulsion power source may include a combination of lithium titanate batteries and other types of batteries or ultra capacitors.

A charge/discharge control circuit may receive measurement signals from sensors of the batteries, such as temperature sensors, voltmeters and ammeters. Based on the input signals the control circuit can compute the present charge capacity, and can set a certain state of charge (SOC), and thereby control the charge/discharge of the batteries of the power source. A battery may receive power from an external or internal power source.

The battery power source of a heavy-duty vehicle may include an electrode group with a spiral structure formed of a positive electrode, negative electrode and separator between the positive and negative electrode. The electrode group may be formed by winding the positive electrode and negative electrode with the separator, and then subjecting the resultant structure to thermal pressing. Alternatively, the positive electrode, negative electrode and separator may be formed by using an adhesive polymer. A positive terminal can be electrically connected to the positive electrode. Similarly, a band-shaped negative terminal can be electrically connected to the negative electrode. The electrode group may be contained in a container with the ends of the positive and negative terminals made to protrude from the container to form a battery cell.

The battery may include a negative electrode comprising a negative collector, and a negative-electrode layer provided on one or both sides of the collector and containing a negative electrode active material, conductive agent and binding agent.

In accordance with some embodiments of the invention, the negative electrode may include an active material with a metal oxide, metal sulfide, metal nitride or metal alloy. In some implementations of the invention, the negative electrode may include active materials for any battery chemistry known in the art.

A preferable embodiment of the invention may include a negative electrode material containing a lithium titanium complex oxide. Lithium titanate oxides, such as (1) spinel-type $Li_{4+x}Ti_5O_{12}$, (x: $-1 \leq x \leq 3$, and preferably, $0 < x < 1$) or (2)

ramsdellite-type lithium titanate, such as $Li_{2+x}Ti_3O7$ (x: $-1 \leq x \leq 3$) can be used. Lithium titanium complex oxides may include, in addition to lithium titanium oxides, titanium-based oxides that do not contain lithium.

Lithium titanium oxides may include, for example, a metal complex oxide containing at least one element selected from the group of $TiO_2$, Ti, P, V, Sn, Cu, Ni and Fe. The $TiO_2$ may be of an anatase type and may have low crystalline properties acquired at a thermal treatment temperature of 300 to 500 degree C. As a metal complex oxide containing at least one element selected from the group of Ti, P, V, Sn, Cu, Ni and Fe, $TiO_2$—$P_2O_5$, $TiO_2$—$V2O_5$, $TiO_2$—$P_2O_5$—$SnO_2$, and $TiO_2$—$P_2O_5$—MeO (Me is at least one metal selected from the group consisting of Cu, Ni and Fe), etc., can be exemplified. In some cases, the metal complex oxide can have low crystalline properties, and a microstructure in which a crystalline phase and amorphous phase are mixed, or only an amorphous phase exists. By virtue of this microstructure, the cycle performance can be significantly enhanced. In particular, a metal complex oxide containing a lithium titanium oxide and at least one element selected from the group of Ti, P, V, Sn, Cu, Ni and Fe is preferable.

In some implementations, the average grain size of the primary particles of the negative-electrode material may be 1 μm or less. More preferably, the average grain size of the negative-electrode material may be 0.3 μm or less.

Vehicle Body

A heavy-duty vehicle may include any vehicle body composition and structure known in the art. In some cases, a high occupancy or heavy-duty vehicle may have a body structure that may classify it as, for example, a transit bus, a school bus, a delivery van, a shuttle bus, a tractor trailer, or class 5-8 truck.

For example, a heavy-duty vehicle may have a body composed of a metal such as aluminum or steel, or alloys such as a magnesium alloy. In preferable embodiments of the invention, the vehicle may have a lightweight, strong body.

The heavy-duty vehicle may also include a vehicle body including at least one composite material. In some embodiments of the invention, the heavy-duty vehicle body may be substantially formed from at least one composite material. A composite material is preferably a lightweight, non-metallic material. For example, high stress areas of the vehicle may be formed of a composite material such as carbon fiber, balsa and/or structural foam core. In some examples, the bulk of the body may be formed of a high strength fiberglass, balsa and/or foam core.

Several alternate embodiments of the invention may include a vehicle body where the body comprises a first skin, a second skin, and a core between the skins. For example, the core may comprise a honeycomb structure, or may be constructed from balsa wood or foam, or may include a composite material that is or is not the same as the first or second skin materials. Other materials that may form various parts of the vehicle body may include aluminum, stainless steel, fiberglass, aramid, ultra high molecular weight polyethylene, carbon fiber, or other known structural fibers, fiber reinforced plastics or combination thereof. Other combinations of composite materials may be used for various components of the heavy-duty vehicle.

Composites may include materials that may cover a wide range of strength, from low-grade non-structural materials using short fibers or non-oriented fibers with inexpensive resins, to high strength and stiffness properties utilizing woven cloth in a high performance resin system. Body panels may be structural elements, which have high strength, and a preferred embodiment may utilize this type of construction. The common materials for structural composites in commercial applications may include fiberglass, aramid, and carbon fiber cloths and tapes in a vinyl ester or epoxy resin matrix. These materials may have different mechanical properties in terms of tensile strength and stiffness, compressive strength and stiffness, impact resistance, etc. The composite materials can also be corrosion and moisture-resistant when properly constructed.

By utilizing selected combinations of these materials with these individual properties, the vehicle body can achieve the desired performance characteristics of extremely high strength in the plane of the panel or at a right angle, high stiffness, and good impact strength and durability. In some embodiments, the materials may include non-composite materials, composite materials, or a combination thereof. Proper design and construction of these structural composite panels may provide all the necessary strength and stiffness to serve as the sole self-supporting structure of the vehicle chassis, even for intensive urban service.

In some embodiments, the vehicle structure may include a lightweight skeletal frame with a plurality of body panels attached to the skeletal frame. In another embodiment, the body may be molded out of several pieces or one piece.

In accordance with one embodiment of the invention, the floor structure of the vehicle may be substantially formed from at least one composite material. For example, the floor structure of the vehicle may be substantially formed from carbon fiber or fiberglass. Alternatively, the floor structure may be formed of a non-composite material such as a metal, which may include aluminum or steel. The floor structure may be formed of any material that may not burn when exposed to an electric arc, or relatively high heat.

Battery Location

Figure 2A:
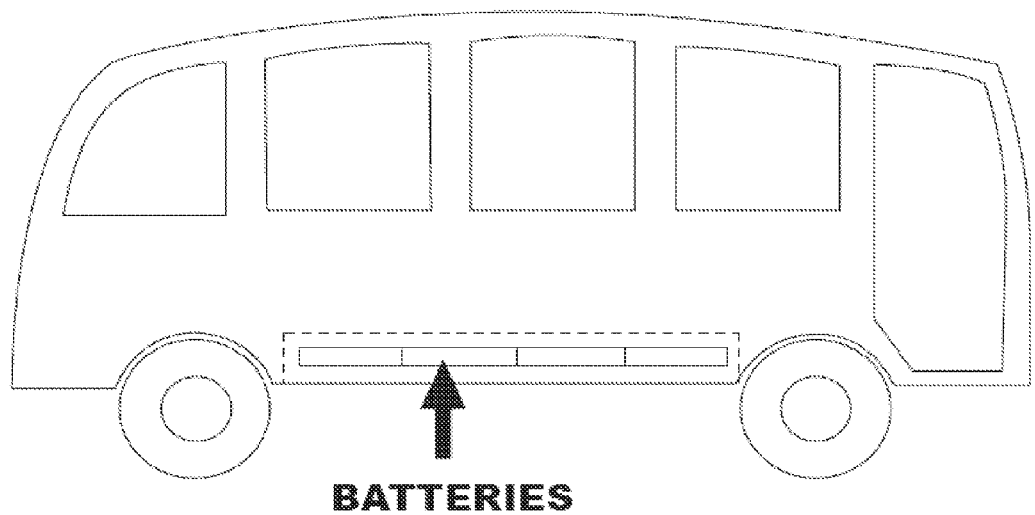
FIG. 2A shows an outline of a heavy-duty vehicle, such as a bus, with batteries stored within the floor of the vehicle.

FIG. 2A shows an outline of a heavy-duty vehicle, such as a bus, with batteries stored within the floor of the vehicle. In accordance with some embodiments of the invention, lithium titanate batteries may be mounted within a floor cavity of the vehicle. The batteries may be arranged into groupings that may be individually mounted into floor cavities from below or from the sides of the bus floor structure. In some embodiments of the invention, there may be a plurality of cavities below the heavy-duty vehicle, which may be separated from one another and may contain one or more grouping of batteries. Alternatively, there may be one cavity below the vehicle, which may contain the groupings of batteries.

Figure 2B:
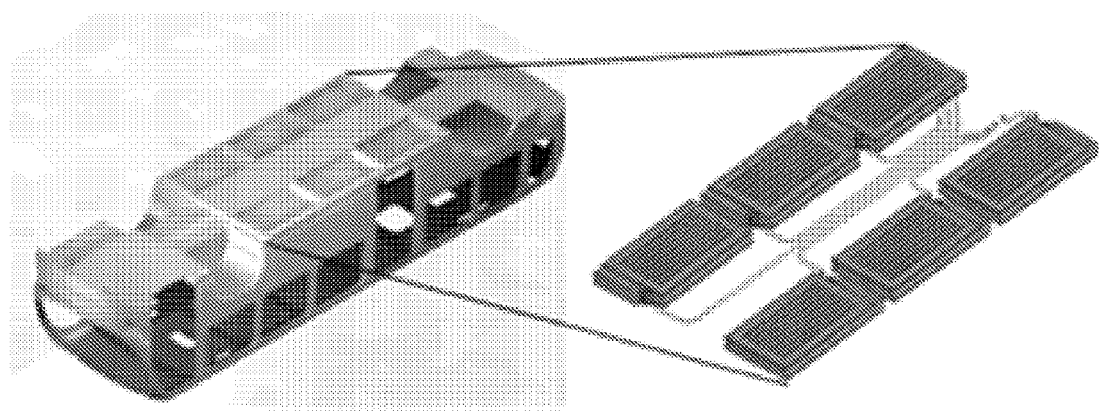
FIG. 2B shows an example of where batteries may be mounted into the floor of a heavy-duty vehicle.

FIG. 2B shows an example of where the batteries may be mounted onto the floor of the heavy-duty vehicle, such as a bus. For example, each of the battery packs may fit into a designated area in the floor of the bus. The battery system may be designed at a 6.75 inch height or less, which may allow it to fit under the floor of a low-floor transit bus. This may allow for a completely low floor chassis with no compromise in the interior seating layout. The bus may have a "true low floor" configuration, such that the bus may have a level floor way throughout the area between the axles of the bus, with energy storage mounted underneath. For example if a bus has two axles, the floor between the two axles may be level and flat between the two axles. This may also apply to heavy duty vehicles with two or more axles; the floor between any of the axles may be level and flat. This may indicate that the floor of the bus may not have protrusions to accommodate the underlying batteries; the batteries may lie flat beneath the floor of the bus. This may contrast with traditional buses, which have boxes underneath passenger seats for the energy storage system, which comprises seating layouts. The battery system may have a height of 8 inches or less, 7.25 inches or less, 7 inches or less, 6.875 inches or less, 6.75 inches or less, 6.625 inches or less, 6.5 inches or less, 6.375 inches or less, 6.25 inches or less, 6 inches or less, five inches or less, four inches or less, or three inches or less.

In some embodiments, each battery pack may have its own compartment within the floor of the bus. In some instances, each battery pack may be physically isolated from the other battery packs. Some of the battery packs may be electrically connected to one another in a string, but may otherwise but electrically isolated from one another.

In alternate embodiments of the invention, the batteries may be integrated into other parts of the heavy-duty vehicle. For example, the batteries may be mounted on the front, rear, top, or side of the vehicle. In some implementations, the batteries may be distributed over different locations on the vehicle. For example, some of the batteries may be stored within the floor of the vehicle while some of the batteries may be stored on the top of the vehicle. Any combination of battery storage locations may be used.

The propulsion power source for a heavy-duty vehicle may include one or more battery assembly. A battery assembly may provide high voltage power to the traction motor, high power accessories, and low voltage accessories in the vehicle through the use of a converter. In one implementation of the invention, a large capacity (e.g., 50 Ah) cell in a series string of batteries in parallel may be safer to operate in the event of a failure than a parallel set of cells in series. Because lithium cells typically fail-short, if the cell was in parallel with many other cells, the other cells could discharge as much energy as is available into the damaged cell. In some cases, cells may be put in parallel first to reduce cost of battery management systems since each cell voltage may be measured. However, in some other embodiments, with larger capacity cells, paralleling batteries before placing them in series may not be necessary. The use of larger capacity cells may increase the safety of the entire assembly without adding cost to the battery management system. Thus, batteries may be arranged in series or parallel, or any combination thereof. Such battery connection flexibility may also allow flexibility in battery placement. Such flexibility of battery placement may be beneficial wherever the batteries are distributed on the vehicle.

In addition, the use of a composite material, or non-burning non-composite material, for the vehicle may allow flexible battery pack placement. In the event of a low-floor design of a heavy-duty vehicle, the height of the batteries may be a constraint. For example, in some embodiments, such as a low floor transit or school bus, the batteries may need to be maintained to less than 6.75" in height. Integrating the battery packs into the floor of a vehicle may keep the center of gravity of the vehicle much lower and balance weight distribution, thus increasing drivability and safety.

Battery Arrangement

Figure 2C:
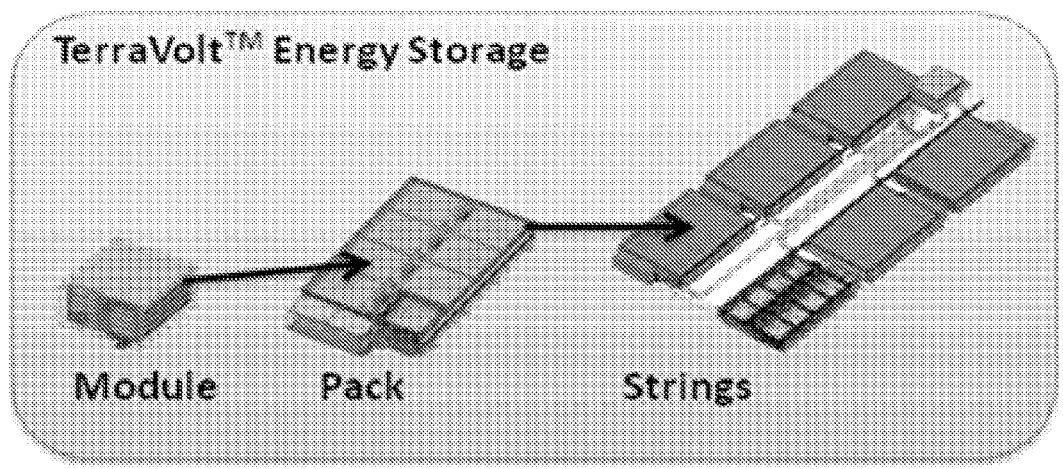
FIG. 2C shows an example of a battery arrangement.

FIG. 2C shows an example of a battery arrangement. A module may fit within a battery pack, which may fit within a battery assembly, which may include strings of battery packs connected in series.

Figure 3:
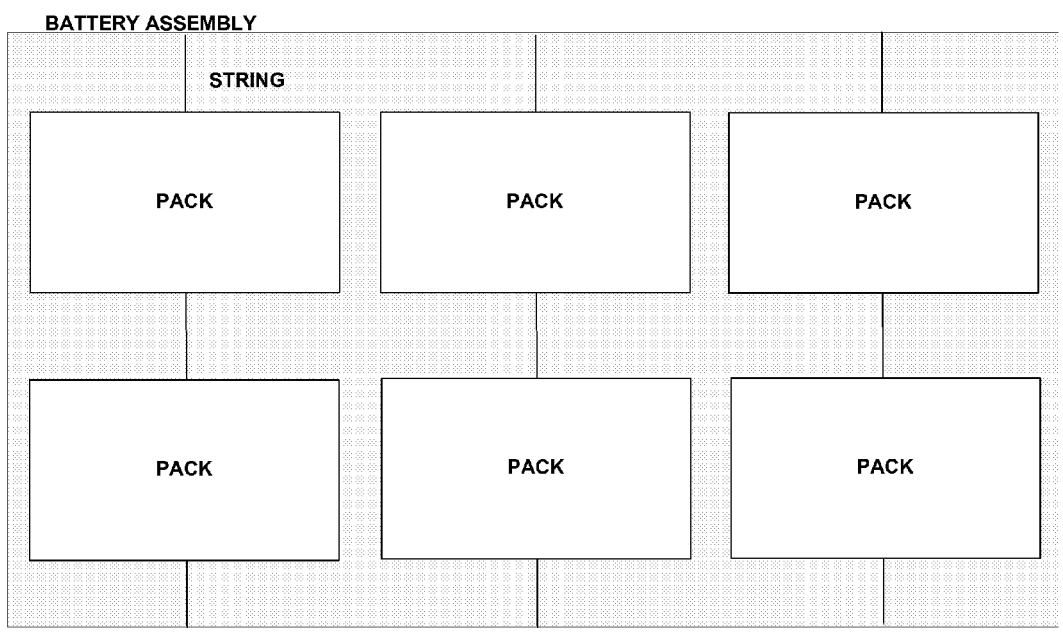
FIG. 3 shows a high level outline of a battery arrangement that may be used as a propulsion power source in accordance with one embodiment of the invention.

FIG. 3 shows a high level outline of a battery arrangement, which may be used as a propulsion power source in accordance with one embodiment of the invention. The battery assembly in a vehicle may be designed to have any number of main battery strings. For example, in embodiment, the battery assembly may include three main battery strings. Each string may consist of a number of battery packs. For example, there may be two packs per string. Each string may or may not have the same number of packs. For example, each string may have two packs. In another example, one string may have two packs, another string may have one pack, and another string may have five packs. The strings may be arranged so that they are connected in parallel. Alternatively, the strings may allow the packs to be connected in series.

A battery management system (BMS) may be integrated into the packs and/or modules to give early warning to potential problems with weaker battery cells within a string. The BMS can give accurate feedback on cell voltages and temperatures within the modules in order to ensure a healthy battery pack. If there are any problems with a particular string, those modules can be automatically removed from service and the vehicle can operate on reduced capacity until the end of the day if necessary. The BMS can disconnect a battery string if a fault is detected. Even if an entire battery string is connected, the vehicle is capable of operating.

Figure 4:
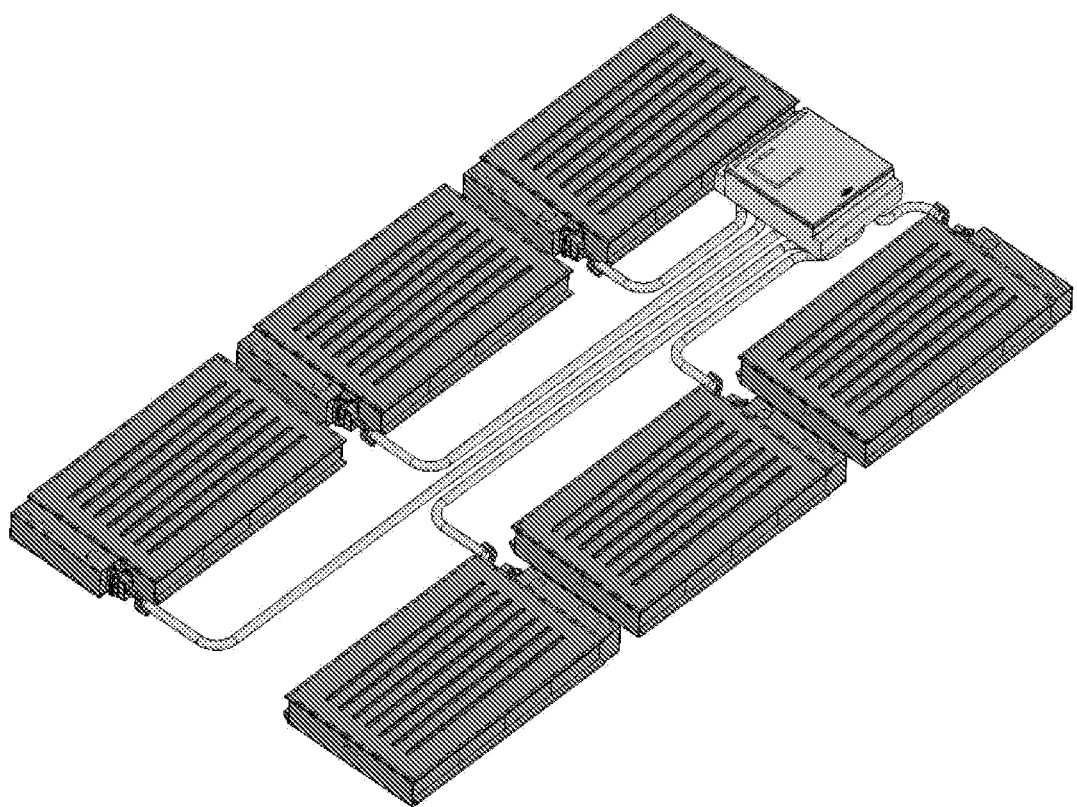
FIG. 4 shows a schematic of a battery assembly that may be used to propel a heavy-duty vehicle.

FIG. 4 shows a schematic of a battery assembly that may be used to propel a heavy-duty vehicle, such as a bus, in accordance with one embodiment of the invention. In some cases, the packs may be electrically arranged in a staggered configuration to match cabling resistances and ensure similar operation of each string. One example of a staggered configuration is a group of four packs (pack 1, pack 2, pack 3, pack 4 lined up from near to far), that are arranged into two strings. The first string may connect pack 1 and pack 4 together, while the second string may connect pack 2 and pack 3 together. Each pack may have the same amount of wire connecting the two batteries even if each pack is a different distance from the junction area. Each pack may be individually mounted from below the vehicle into one, two, or more cavities built into the floor.

A pack may include boxes or containers that enclose the contents of the pack. The containers may have any shape or configuration that may enable them to hold the contents of the battery pack. The containers may be watertight and may be formed of a material that will not oxidize or burn when exposed to an electric arc. For example, the material for the containers may be a 3CR12 stainless steel to protect against corrosion from road salts, inhibit oxidation when in contact with an electric arc, and help with material fatigue. Other materials, such as composite materials, may be used that may have similar features.

Battery Pack Design

Figure 5:
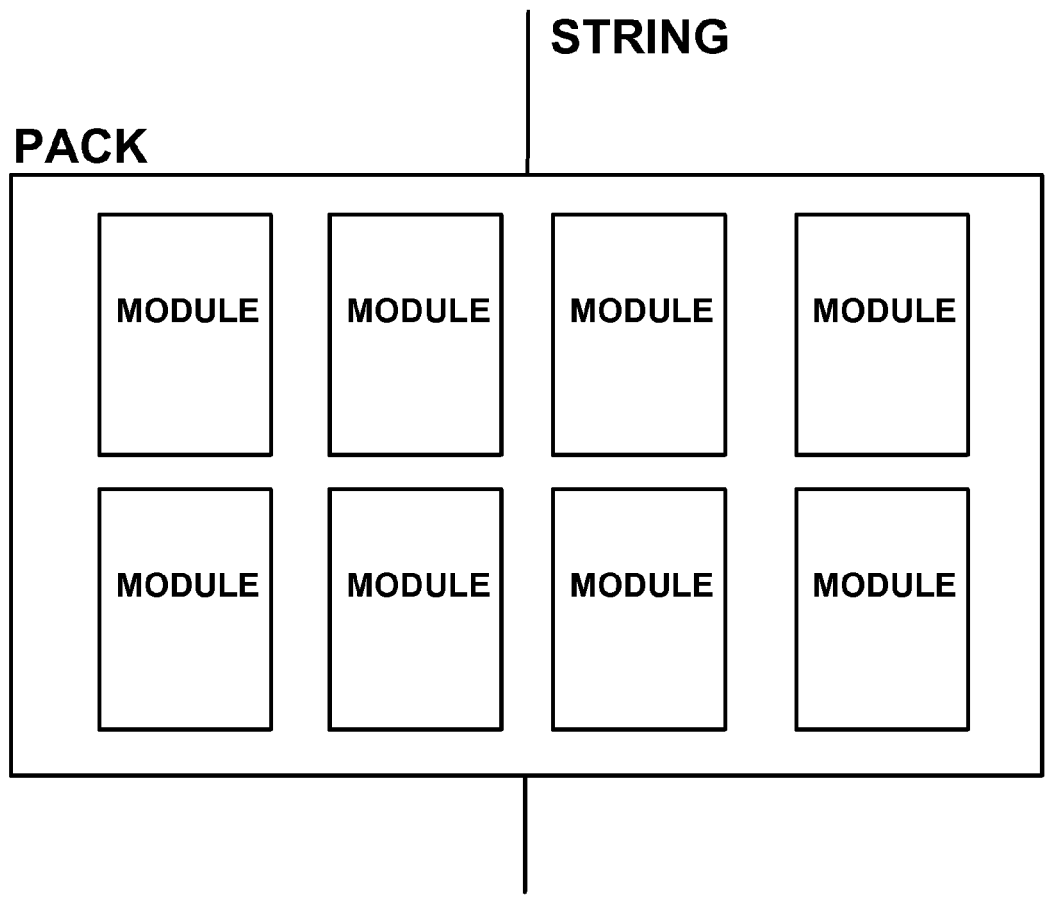
FIG. 5 shows an example of a battery pack of a string.

FIG. 5 shows an example of a battery pack of a string. A battery pack may include one or more modules. For example, battery packs may each contain eight modules. Each battery pack of a battery assembly may or may not include the same number of modules. For example, one battery pack may include six modules, while another battery pack may include eight modules, while another battery pack may also include eight modules.

The pack design may accommodate safety and size. In a pack design, a number of factors may be considered including detection, containment, isolation, and suppression. Each of these areas may address a group of potential problems that could occur and may help to meet all applicable Federal Motor Vehicle Safety Standards.

A BMS may be a primary detection method of a problem with a particular cell, module, pack, or string. The BMS may detect when a failure occurs and may be able to direct the battery assembly to disconnect portions of the battery assembly, such as individual battery strings, where the failure may have occurred, in order to prevent other portions of the battery assembly from being compromised and to allow continuous operation of the vehicle. The BMS may communicate with and within each pack to achieve the desired level of detection and management.

The pack may be watertight and may provide containment. The pack may be contained within a container or box that may protect the pack from external elements that may damage the contents of the pack. The pack container may be designed to protect the pack for a long period of time. In addition to protecting the contents of the pack from external threats, the container of a pack may contain any failures that may occur within a pack, in order to prevent damage to other packs or portions of the vehicle.

Dividers between the modules may protect modules from other modules that may have a failure, thus providing isolation. If a module were to fail, the dividers may protect other modules from the failed module. The dividers may or may not be integrated into the pack container structure and may be made of a material that may not oxidize when exposed to electrical arcs or high temperatures. FIG. 2C shows an example of a pack container with module dividers.

Suppression may not necessary due to the very limited airspace within the enclosure. In some cases, suppression configurations may be added, which may require providing an exhaust path for the suppression material. The exhaust path may consist of an opening drilled in a section of the pack with a spring-return shield and a gasket material to seal the exhaust opening when it is not in use.

In some embodiments, a battery pack may include modules with integrated heat sinks, cooling features such as a cooling plate, module retainers, buss bars to attach modules together, and one or more small compartments that may house the BMS boards, relays, and fuses. The compartment may or may not be substantially thermally and/or physically isolated from the modules. Interconnection wiring may run to a watertight connector in the small end-box that can disconnect power to the relay, thus making the terminals of the connector safe when the main cable is disconnected. The pack may include integrated cooling features in addition to cooling features of the modules. In some implementations, integrated cooling plates can provide cooling from a main vehicle electrical cooling system. In some embodiments, the cooling plates may preferably be maintained below 43° C. for operation of the batteries. Other cooling features known in the art, such as various heat sink arrangements or use of convection cooling may be used in a battery pack. Active cooling techniques, such as fluid cooling, which may utilize fans, the passage of air, liquid, or other fluids, may also be utilized.

A thermal shield consisting of a spray-on ceramic coating on the lowest point of the packs may be applied to packs exposed to the underside of the vehicle or anywhere else where radiated heat may be a concern.

Such a battery pack design may have the following benefits: low cost integration, design for safety, ease of assembly, may be maintenance free, and may have simple mounting.

Battery Module Design

Figure 6:
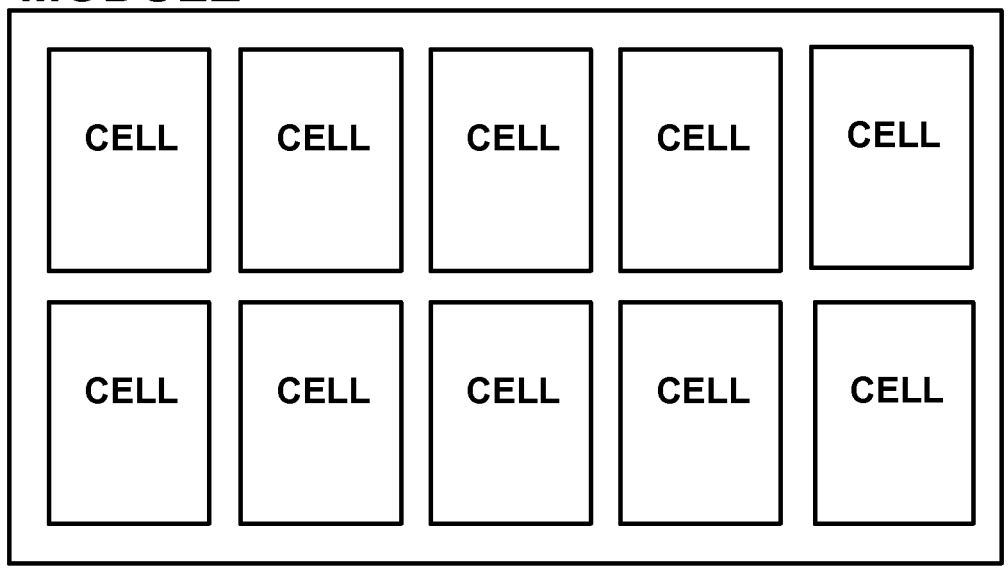
FIG. 6 shows a high-level outline of a battery module.

FIG. 6 shows a high-level outline of a battery module. A battery module may include one or more battery cells. In a preferable embodiment, the battery cells may be lithium titanate battery cells. In other embodiments, the battery cells may have other battery chemistries known in the art. For example, each module may comprise ten battery cells. Each module may or may not include the same number of battery cells. For example, one module may include eight battery cells, while another module may include twelve battery cells, and another module may include thirteen battery cells, while yet another module may include thirteen battery cells.

The cells may have any arrangement or connection within the module. For example, the cells may all be connected in series. Alternatively, the cells may be connected in parallel. Or in some cases, the cells may be connected in a combination of series or parallel within the module.

The battery cells may have various specifications, such as various voltages. For example, each cell for a lithium titanate battery may be at 2.3 $V_{nominal}$, 50 Ah giving a nominal energy of 115 Wh. Each cell, such as lithium ion batteries or other types of batteries, may or may not vary in its specifications. In some embodiments, the cells may be prismatic cells. Each prismatic cell may be housed in a specialized Mylar/foil pouch and may be somewhat fragile. The module housing can be designed to and protect the cells from outside damage, making them easier to handle, and providing cooling support.

The modules may include cooling features. For example, modules may have integrated aluminum cooling fins placed between each cell. In other examples, cooling plates may all link up to an anodized aluminum backplane that can then be cooled to support even cooling through the module. Other cooling features known in the art may be used, such as various heat sink arrangements, forced convection cooling, and so forth.

Figure 7:
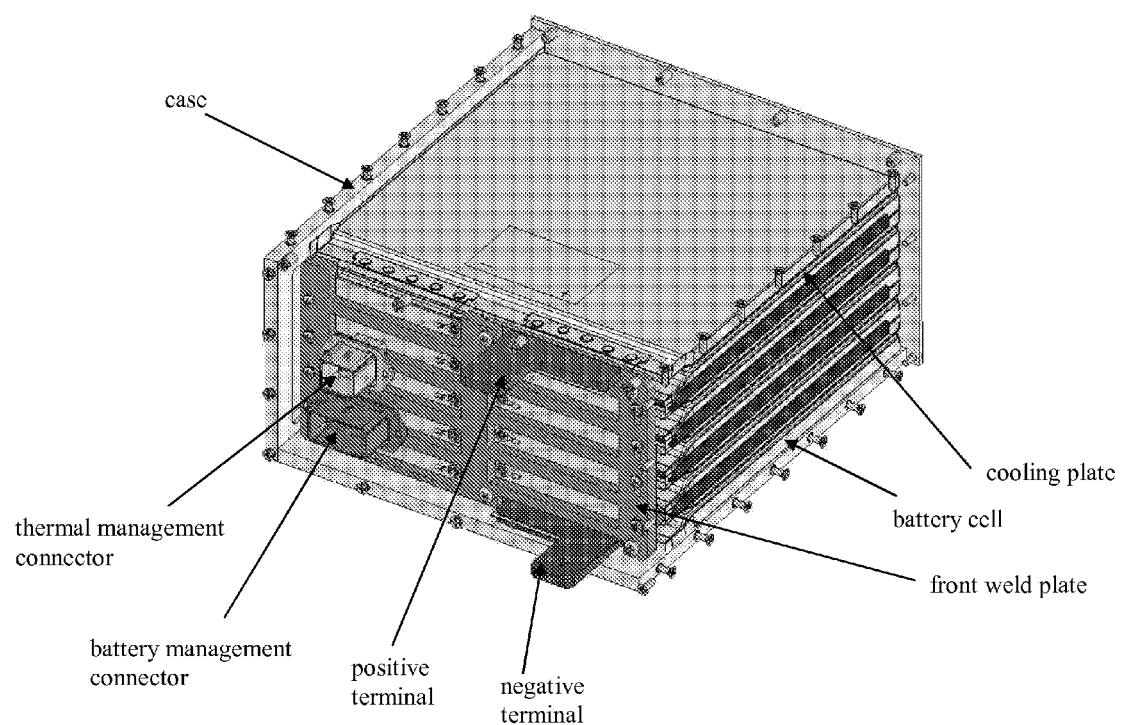
FIG. 7 shows an example of a module in accordance with one embodiment of the invention.

FIG. 7 shows an example of a module in accordance with one embodiment of the invention. The case of a module may be made of an ABS material that can be easily machined and produced very rapidly. In other implementations, the case of a module may be of other materials, such as a composite material, fiberglass, or carbon fiber. In some examples, the case may be made from a material that may provide some level of isolation, such as a material that may not burn when exposed to an electric arc. A front weld plate can be included to accurately locate and hold the terminals to the case to reduce fatigue stress cracks in the cell tabs. In some cases, the cell tabs may be made of a metal, such as aluminum. BMS connectors can be integrated into the front of the module for quick connection of an off-board BMS. Terminals may be offset and tapped for vertical installation of attachment bolts and ease of assembly.

Modules must be isolated from each other to protect against potential short-circuiting. This can be accomplished through careful material selection and post processing of the heat sinks. If a short is ever detected through the BMS, the system may disconnect each pack in the string, which can isolate the fault. This level of safety may be included in the event of a major crash or failure of the isolation system.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A low-floor electric bus comprising:
   a body made of a composite material;
   a floor made of a composite material; and
   a plurality of battery packs mounted under the floor of the low-floor electric bus such that the floor inside the bus in an area that extends an entire width of the bus between a front axle and a rear axle of the bus is substantially flat.

2. The low-floor electric bus of claim 1, wherein each battery pack of the plurality of packs has a height of 8 inches or less.

3. The low-floor electric bus of claim 2, wherein each battery pack of the plurality of battery packs has a height of 6.75 inches or less.

4. The low-floor electric bus of claim 1, further including a battery power source mounted on a roof of the bus.

5. The low-floor electric bus of claim 1, wherein the composite material of the body comprises a first skin and a second skin with a core sandwiched between the first and the second skins.

6. The low-floor electric bus of claim 5, wherein the first and the second skins include fiber glass and the core includes balsa wood.

7. The low-floor electric bus of claim 1, wherein each battery pack of the plurality of battery packs is positioned in a cavity under the floor.

8. The low-floor electric bus of claim 1, wherein the plurality of battery packs includes a plurality of lithium titanate battery packs.

9. The low-floor electric bus of claim 1, wherein the plurality of battery packs are configured to be charged to over 90% state of charge in ten minutes.

10. A low-floor electric bus, comprising:
    a body made of a composite material;
    a floor made of a composite material;
    one or more cavities provided under the floor; and
    a plurality of battery packs positioned in the one or more cavities such that the floor has a low-floor configuration wherein the floor inside the bus between a front axle and a rear axle of the bus is substantially flat.

11. The low-floor bus of claim 10, wherein the plurality of battery pack include one or more lithium titanate battery packs.

12. The low-floor bus of claim 11, wherein the plurality of battery packs include at least one battery pack having a chemistry different from the one or more lithium titanate battery packs.

13. The low-floor bus of claim 11, wherein each battery pack of the one or more lithium titanate battery packs has a height of 8 inches or less.

14. The low-floor electric bus of claim 10, wherein the composite material of the body comprises a first skin and a second skin with a core sandwiched between the first and the second skins, and wherein the first and the second skins include fiber glass and the core includes balsa wood.

15. The low-floor electric bus of claim 10, wherein the one or more cavities permit mounting of the plurality of battery packs into the one or more cavities from below an underside of the low-floor electric bus.

16. A low-floor electric bus, comprising:
    a body formed from a composite material as one piece;
    a drive motor provided on a rear of the body;
    a floor made of a composite material; and
    a battery power source configured to provide power to the drive motor, the battery power source including a plurality of battery packs mounted under the floor such that the floor inside the bus in an area that extends an entire width of the bus between a front axle and a rear axle of the bus is substantially flat, wherein each battery pack of the plurality of battery packs have a height of 8 inches or less.

17. The low-floor electric bus of claim 16, wherein the composite material of the body comprises a balsa wood core sandwiched between fiber glass skin layers.

18. The low-floor electric bus of claim 16, wherein each battery pack of the plurality of battery packs is mounted in a cavity of one or more cavities formed under the floor.

19. The low-floor electric bus of claim 16, wherein the plurality of battery packs includes one or more lithium titanate battery packs.

20. The low-floor electric bus of claim 16, wherein the battery power source is configured to be charged to over 90% state of charge in ten minutes.

* * * * *